United States Patent Office 3,547,586
Patented Dec. 15, 1970

3,547,586
INORGANIC PHOSPHATE ASSAY, AND
REAGENTS THEREFOR
Jerry W. Denney, Greenwood, Ind. (45 Thornhurst Drive,
Carmel, Ind. 46032), and Larry W. Denney, 1150
Chessington Drive, Indianapolis, Ind. 46260
No Drawing. Filed June 5, 1967, Ser. No. 643,363
Int. Cl. G01n 21/06, 21/20
U.S. Cl. 23—230
23 Claims

ABSTRACT OF THE DISCLOSURE

An assay for quantitative determination of inorganic phosphorus. From the procedure standpoint, it is a two-step process, using polyvinylpyrrolidone to speed up the formation of the yellowish phospho-molybdate, and, after converting to an alkaline pH, uses hydroxylamine to reduce that complex to a bluish complex to be measured; although both the polyvinylpyrrolidone and the hydroxylamine are in a single reagent which is mixed with the sample.

INTRODUCTORY COMMENTS AS TO NATURE OF THIS INVENTION

This invention relates to the quantitative determination of inorganic phosphate, that is, the measurement of the level or amount of inorganic phosphate in a given unit amount of specimen or sample to be assayed.

Concepts of the present invention increase accuracy and speed of this determination, and provide other specific and overall advantages, as set forth and explained in the following description.

INTRODUCTORY COMMENTS AS TO PHOSPHORUS AND ITS QUANTITATIVE DETERMINATION

It has been long recognized that the determination of the amount or level of phosphorus is a valuable diagnostic tool; for phosphorus levels appear to vary characteristically in a variety of pathological and physiological conditions.

Since at least as long ago as 1887, (1) accordingly, the problem of quantitative determination of phosphorus has been dealt with in the clinical laboratory field. The phosphorus to be measured in these determinations is in the form of phosphates and, more particularly, in the form of inorganic rather than organic phosphates. The samples or specimens to be assayed are blood serum and urine.

Phosphorus, in its phosphate form, is of critical importance to the body in general, and also to various body components. For example, phosphorus is a major and vital constituent of bones and teeth; it is the major buffer, controlling the pH of blood serum; phosphate excretion is involved in the kidneys' role in controlling the acid-base balance of the body, and is the mechanism by which the parathyroid hormone regulates serum calcium; phosphorus is used in forming most of the lipid material of the brain and cytoplasmic membrane of cells; and it is the compound which is used in the obtaining of energy from food.

In various pathological and physiological states and conditions, one or more of these processes appear to be altered in such a way as to give a characteristic change in serum and/or urinary phosphate levels.

Accordingly, as illustrating the value of inorganic phosphorus determinations, they are useful in diagnosing and/or evaluating each of the following: bone formation and destruction; bone metabolism; parathyroid secretory activity; diabetic acidosis; pyloric obstructions; respiratory alkalosis; other acid-base inbalances; and renal insufficiency or other kidney disorders. (2)

In addition to the usefulness of inorganic phosphorus determination in measuring serum and urinary inorganic phosphate, phosphorus assay may be used to measure inorganic phosphate generated in procedures for the determination of Creatine phosphokinase activity (CPK).

(CPK is an enzyme which is present in the body only in muscle and brain tissue. Since the heart is a type of muscle, when the heart is damaged it loses CPK into the blood stream; and, since there is normally no CPK in the blood stream, its presence is the most specific test yet devised for myocardial infarction.) (3)

(The CPK test is also used to diagnose diseases of the skelatal muscles, such as muscular distrophy.) (4)

Although it has been pointed out above that the phosphate form of phosphorus is indeed of vital importance to the body, there appears to be only a rather narrow range (5) of serum phosphate levels in which these processes effectively function. Accordingly, because of that limited range and to improve diagnostic usefulness, accuracy is of particular significance in the quantitative determination of the phosphate level or amount.

Also, practical considerations of the clinical laboratory or other test locations require that the test be relatively rapid and easily performed, even by personnel having limited training. For example, in modern clinical laboratories, a technician would often be called upon to perform, simultaneously, a number of different and various tests and assays.

Presently-used phosphorus-determination procedures do not sufficiently fill one or more of these requirements of accuracy, rapidity, and ease of performance; nor do they sufficiently overcome nor satisfactorily solve all the other problems inherent in and/or unique to the quantitative determination of inorganic phosphorus.

PARTICULAR PROBLEMS OF PHOSPHORUS-DETERMINATION (a) *Protein.*—Protein is a problem in phosphorus-determination because it is precipitated by the molylbdenum which is used in many of the procedures and thereby causes a turbidity of the sample. The turbidity would be interpreted as phosphorus in the subsequent analysis. Accordingly, certain present procedures attempt to precipitate the protein as a preliminary step, as now mentioned in more detail.

(b) *Protein-precipitation.*—To overcome the disadvantage of protein in the specimen, certain precipitants are used, followed by a separation step such as centrifugation or filterization, in an express attempt to rid the specimen of its protein content. However, this attempted answer to the protein problem introduces other problems, as follows:

The effectiveness of protein-precipitate removal is inconsistent; and any remaining precipitate which often may

---

(1)—See note at end of specification.

(2), (3), (4), (5)—See notes at end of specification.

be undetected, or, if detected, is difficult to remove, would create the turbidity-error mentioned above. (6)

Protein precipitation and removal does not readily lend itself to automation; and this factor, and other attempts to circumvent it, produce other problems, as discussed below.

The precipitant used is ordinarily trichloroacetic acid, which lowers the pH over a prolonged time interval required for protein-removal; and these conditions have been reported to cause hydrolysis of phosphate esters, giving positive errors as mentioned further below. The precipitating step, particularly with its extra centrifuging or filtering step, is time-consuming and is at extra cost and effort in other respects.

(c) *Concentratons of molybdenum and sulfuric acid.*— In order to obtain reasonably rapid reaction rates, the reactants molybdate and sulfuric acid, which are used in the color-formation steps of the assay, are used with high concentrations of either or both of these reactants. (7) However, high concentration of molybdate causes precipitation of protein, with turbidity-error as mentioned above; high acid concentration relative to the molybdate concentration, although decreasing turbidity-effect, decreases the reaction rate and causes hydrolysis of organic esters as mentioned below.

(d) *Phosphate esters.*—It is to be again noted that the diagnostic evaluation is of inorganic rather than the organic phosphorus. Yet, of the total phosphorus normally present in serum, the major proportion is in the organic form, principally phosphate esters. (8) Any procedure which would inadvertently include as little as 5% of the organic phosphorus would contribute an error larger than the entire range of the normal inorganic phosphorus levels.

An inorganic phosphate results from the breakdown, or hydrolysis, of such esters; and any of such resulting inorganic phosphate would be falsely interpreted as a part of the inorganic phosphate constituent of the specimen, with resulting and substantial error of the assay. This is seen to be a particular problem when one considers that the organic phosphorus content of serum and/or urine is not constant; for example, organic phosphorus content varies from 5 to 14 mg. per 100 ml. of serum. (9) Thus when ester hydrolysis is present, there can be no constant contribution therefrom assumed for purposes of establishing normal values, since the contribution varies widely and not always in correlation with the inorganic level. As mentioned above, strong concentration of acid or molybdate, or of both, accelerates such hydrolysis. (10)

(e) *Time.*—Time of reaction and of overall procedure is significant not only because of time-and-cost considerations, but also from the standpoint of avoiding the introduction of inaccuracies such as that of increased ester hydrolysis occasioned by the prolonged exposure to conditions contributing to such hydrolysis. Ester hydrolysis, and consequently the error attributable thereto, are directly proportional to the length of exposure.

(f) *Reductant instability.*—To the extent that any of the reductants are unstable, significant and even gross errors are caused, particularly if the instability has not been recognized. The repeated checking of reagent condition is a bothersome and time-consuming task. Although some reductants have been reported to be stable, it seems that those most generally used are unstable, including stannous chloride, para-aminonaphtholsulfonic acid, and P-semidine.

(g) *Lack of conformance to Beer's Law.*—Certain procedures for phosphorus-determination do not show a linear relationship between the absorbance of the colored product and the concentration of phosphorus, in the photometric analysis. The desirability of a linear relationship is generally recognized in analysis; for, where there is no such linear relationship, it is often that there is also a lack of consistency. Moreover, a linear relationship makes it possible for the operator to draw conclusions, from a single control test, concerning the entire range of concentrations.

PRIOR PROCEDURES

It may be convenient to classify prior procedures of quantitative phosphate-determination as follows: Protein-precipitating methods; Non-protein-precipitating high-acid method, and Enzymatic methods.

(a) *Protein-precipitating methods.*—These methods precipitate the protein, attempting to avoid as much as possible the turbidity-error mentioned above, commonly using trichloroacetic acid as the precipitant, followed by a separation step such as centrifuging or filtering. The phosphate is then reacted with molybdate ion, commonly furnished by a solution of ammonium molybdate in dilute sulfuric acid of concentration in the order of 3 normal, in the presence of a reducing agent such as para-aminonaphtholsulfonic acid.

There is formed from the molybdate and phosphate a molybdo-phosphate complex, which in the presence of the reducing agent, is reduced to a blue-colored molybdo-phosphate complex, the absorbance of which is measured photometrically and related to the absorbance of a standard molybdo-phosphate, which yields quantitation of the phosphorus.

An example of this type of assay is that of Fiske and SubbaRow. (11)

Methods of this type differ primarily in the reducing agent employed, these including ferrous sulfate, stannous chloride, semidine, elon, and others.

These methods take from about 25 minutes to an hour, of which about 10 to 15 minutes are taken in the preparation of the protein-free filtrate, and 15 to 45 minutes for the color-formation reaction. During the entire period, the organic esters are exposed to acid, thus exposing them to hydrolysis and consequent error, as discussed above.

Disadvantages which are inherent in these methods include those of protein-precipitation, ester-hydrolysis, time, and in some cases reductant-instability, each as discussed above.

(b) *Non-protein-precipitating high-acid method.*—As represented by a method referred to in technical literature of Hycel Inc., (12) there has been an attempt to solve the problem of protein interference by the use of a high acid concentration, that is, an acid concentration high enough that the molybdenum will not precipitate the protein. In that method, 0.2% molybdate in 3% sulfuric acid is used in combination with ferrous ammonium sulfate as a reductant.

The procedure, although simple from a manipulation standpoint, takes about 35 minutes to perform, and therefore is handicapped by the time involved and also by the prolonged exposure of phosphate esters to hydrolysis. Moreover, the cited Hycel reference states that glucose levels above 200 mg. percent interfere with the test; and since phosphorus determinations are frequently done in connection with specimens from diabetic individuals, this interference significantly limits the utility of the procedure.

The reagent used n this procedure is stable for 1 year only under refrigeration.

The procedure embodiment described in the Hycel literature fails to obey Beer's law, which as described above, indicates another disadvantage of the said Hycel procedure.

(c) *Enzymatic method.*—This method uses multiple enzyme systems leading to the formation of a co-enzyme (NADPH), the absorbance of which is measured in the ultraviolet range; but instruments of this type are not possessed by many laboratories. Moreover, the use of

---

(6), (7), (8), (9), (10)—See notes at end of specification.

(11), (12)—See notes at end of specification.

multiple enzymes makes reagent-instability a virtual certainty and also makes pH and temperature critical. Also, it is relatively expensive.

Accordingly, although it may be useful as a research technique, the method is not considered suitable for routine laboratory use.

THE PRESENT INVENTION CONCEPTS

(a) A first embodiment

*Step I.*—In carrying out the invention in a desired embodiment, in a first step a solution of polyvinylpyrrolidone (the formula:

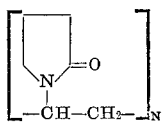

is a possible representation of the structural formula of polyvinylpyrrolidone) in hydroxylamine hydrochloride is added to molybdate solution, and the serum or other specimen is added to the resulting solution. In a specific desired form, the quantities and other particulars are:

2 cc. of 5% polyvinylpyrrolidone in 2% hydroxylamine hydrochloride solution (desirably with a trace of dichlorophene as a safeguard preservative);
1 cc. of 1% solution of ammonium molybdate in 5% sulfuric acid;
0.3 ml. serum or standard.

*Step II.*—In a second step, after the above mixture has stood or incubated for one minute, a strong base is added which, in a desired embodiment, is a 0.2 cc. quantity of 10 N NaOH. In this step, the hydroxylamine hydrochloride is activated to release its hydroxylamine for its reducing effect; and the hydroxylamine, in the alkaline pH, effects the reduction of the yellow phosphate complex to the blue complex to be measured. The strong alkaline pH also eliminates turbidity by solubilizing the protein.

After letting this stand for five minutes, in this embodiment, the absorbance is read at the usual wave length used for the molybdenum blue color, that is, 650 mu.

In contrast to the aforesaid prior procedures for measuring the molybdenum blue, which have included a two-step process in which the first step was a protein-elimination step and the second step was an acid step, and have included also a single-step process (Hycel) which was wholly an acid step, the above-described embodiment of the present invention is a two-step process in which the first step is an acid or slightly acid step and the second step is an alkaline step; moreover, in the first step in this present invention, the inorganic phosphorus is converted to the yellow molybdate complex, and its reduction to the measurable blue form is in the second step.

In further contrast to the other procedures, the assay, according to the above-described embodiment of the invention, utilizes as a reductant hydroxylamine hydrochloride, even though it is virtually ineffective as a reductant in the other procedures, and even though it is known to be unstable in an alkaline pH which is the condition which is employed in this procedure.

(b) High advantages of the invention

The assay according to the present invention provides a quantitative determination of inorganic phosphorus, and provides several advantages over other assays for that determination. Specific advantages are now pointed out.

(1) *Accuracy and reliability.*—The invention presented departs from other methods in that coupling of molybdate and inorganic phosphate is catalyzed, in the formation of the yellow complex. This allows the use of very mild acid conditions and only 1 minute of exposure of acid-labile esters to hydrolysis, as opposed to 20–60 minute exposure used in other procedures. Thus, the method is of specific advantage for determining inorganic phosphorus to the exclusion of organic phosphorus present.

The final pH of the assay in Step II is strongly alkaline. Although it is well known that alkali hydrolyses phosphate esters, and therefore an alkaline pH might seem to be quite contra-indicated in view of the well-known ester hydrolysis problem discussed above, in the present invention such hydrolysis does not take place, since only the yellow molybdo phosphate complex which had been formed in Step I takes part in the alkaline Step II conversion to the blue form. Thus, any esters, even though they may be hydrolyzed in Step II, do not react in any color-forming manner in the final alkaline stage of the procedure. In fact, organic phosphate esters can be added in high concentration in the alkaline Step II without effect.

Turbidity, which contributes to the inaccuracy of procedures in which an attempt has been made to prepare protein-free filtrates, as well as the high acid procedure, does not interfere in the assay according to the present invention; for, the catalyst allows the phosphate and molybdate reaction to proceed to substantial completion, thereby permitting the subsequent use of an alkaline pH to eliminate protein turbidity. Accordingly, the need for protein-removal, or any attempt thereof, is obviated.

Also, glucose does not interfere in the assay according to this invention, as it does in the high acid procedure. (12)

The absorbance characteristics of the color formed by assays according to this invention conform to Beer's law.

(2) *Speed.*—The method, according to this invention, is more rapid than the others discussed above. While other procedures require 25 minutes to 1 hour to perform, the assay according to the present invention may be done in 7 minutes.

(3) *Ease of performance.*—The method presented is simple, even for a technician with limited training to perform, since there is no step of attempting to obtain protein-free filtrate. Only the Hycel method is as easy to perform, from a manipulation standpoint; but it has other disadvantages referred to herein.

(4) *Reagent stability.*—The reagents used in the above-described procedure of this invention may be stored at room temperature for at least one year, with no appreciable deterioration. Many prior procedures employ an unstable reductant. The procedure of this invention as described above uses as the reductant hydroxylamine hydrochloride, which is stable in solution. The Hycel reagent is stable only under refrigeration.

(5) *Effectiveness in automated analysis.*—This invention is particularly suited to automated procedures for the following reasons, in addition to its greater accuracy:

Many methods of automation have no provision for the preparation of a protein-free filtrate in an automated fashion; and this step must be performed manually. Also, instruments for automated procedures are particularly troubled by turbidity. The invention described requires no protein-free filtrate and is particularly free of turbidity.

The one automated piece of equipment used for determination of inorganic phosphorus which does not require protein-free filtrates employs dialysis to circumvent the protein problem. Dialysis causes a number of problems including loss of sensitivity, great increase in maintenance problems in the dialyzation unit, and carryover problems in the dialyzer necessitating washing the dialyzer for extended periods of time. Because the reactions used are slow, a heating bath must be used to accelerate the reaction.

The invention here presented eliminates the use of the dialyzer and heating bath, thus simplifying the procedure and reducing maintenance problems.

---

(12)—See note at end of specification.

(c) *Ranges, proportions, etc.*

(1) *Concentration of polyvinylpyrrolidone.*—At least 3% solution must be used in the above procedure to obtain optimal reactivity; however even a trace amount of the compound appears to catalyze the reaction and may be used.

(2) *Concentration of molybdate.*—In the procedure outlined, concentrations from 0.85% to 3% molybdate are optimal. With different amounts of serum the amount of molybdate may vary, and, because a catalytic effect is obtained, a very wide variety of molybdate concentrations are acceptable if the concentration of other ingredients is altered.

(3) *Concentration of acid.*—Acid concentrations in the molybdate reagent from 0.2% to 6% may be used. However, because of phosphate ester cleavage, low concentrations are desirable.

(4) *Concentration of hydroxylamine compound.*—Concentrations from 0.5% to saturation may be used in the embodiment outlined. With increasing concentrations, the time in Step II of the procedure is shortened, and the color is stable for a longer period of time. Concentrations below 0.5% may be used, but are not optimal. With various combinations of other reagents, and amounts of samples in other embodiments, these concentrations will vary; but it has been found that the amount of hydroxylamine of the hydroxylamine compound used should be at least 0.75 micrograms for each microgram of phosphorus which is to be measured in the test. A variety of hydroxylamine compounds may be used, for example hydroxylamine sulfate.

(5) *Concentration of base.*—The base concentration must be such that the solution in Step II is converted to an alkaline pH. 10% to 50% is most workable in this embodiment, but the exact amount varies with the amount of sulfuric acid in the molybdate reagent. Almost any base can be used, including sodium hydroxide, potassium hydroxide, ammonium hydroxide, etc.

OTHER EMBODIMENTS AND PARTICULAR CONCEPTS OF THE INVENTION

The co-operating concepts set forth above in what is designated as the first or overall embodiment of the invention may be advantageously utilized in other embodiments of a phosphorus-determination assay.

For example, the concept of the use of polyvinylpyrrolidone is a concept which may be advantageously used to accelerate the formation of the molybdo-phosphate complex which speeds up the overall procedure.

Determination of phosphate may be performed using a procedure as outlined in Step I above, but which employs a sulfuric acid concentration in a high enough acid range to eliminate turbidity, and which eliminates the use of the reductant. In such a procedure, the measurement is of the yellow complex formed in Step I, in contrast to the blue product formed in the aforesaid Step II; and the yellow color is measured in the neighborhood of 410 mu. (A blank would be included to eliminate the yellow color of the serum itself.)

As noted above, the hydroxylamine does not perform its reducing effect for the yellowish phosphate complex until the solution is made to have an alkaline pH in Step II. However, it does seem to have a stabilizing effect for the polyvinylpyrrolidone even in the acid pH of the polyvinylpyrrolidone reagent, and the presence of the hydroxylamine hydrochloride compound in the polyvinylpyrrolidone solution does avoid an extra step of its addition by the operator; thus it is presently found to be of desirable advantage to combine the hydroxylamine hydrochloride and the polyvinylpyrrolidone in a single reagent as specified above.

Instead of polyvinylpyrrolidone, a 5% stabilized solution of a long chain polypeptide has been found operative to promote the formation of the phospho-molybdate complex, although the polypeptide is more difficult to stabilize as fully as the reagent set forth above in Sept I. The effect of polyvinylpyrrolidone and of the polypeptide in promoting the formation of the molybdate phosphate complex seems to depend on the fact that they are macromolecules with a high degree of charge and/or polarity heterogeneity.

An assay, according to the novel concepts of the invention, thus provides the many advantages of accuracy, speed, ease of performance, elimination of need for protein-removal, minimization of hydrolysis of phosphate esters, and high reagent stability.

Accordingly, it will thus be seen from the foregoing description of the invention according to the embodiments herein set forth, that the present invention provides a new and useful assay yielding quantitative determination of inorganic phosphate, and reagents therefor, having desired advantages and characteristics, and accomplishing the objects of the invention, including the objects and advantages hereinbefore pointed out and others which are inherent in the invention. Many specific assay problems, including problems unique or specific to the inorganic phosphate determination, are effectively overcome.

It will be understood that modifications and variations of the general and specific concepts of the overall assay may be effected without departing from the scope of the novel concepts of this invention; accordingly, the invention is not to be considered limited to the specific form or embodiments set forth herein for purpose of disclosing and illustrating the inventive concepts.

NOTES (1) Osmond, M. F. Bull. Soc. Chim. Paris 47:745 (1887), cited in Henry, R. J., Clinical Chemistry, Harper & Row, 1964, p. 414.

(2) Best, C. H. and N. B. Taylor, The Physiological Basis of Medical Practice, Williams & Wilkins, 1961, p. 4.

(3) Duma, R. J., Arch. Intern. Med., 115:443, 1965, cited in SIGMA Tentative Technical Bulletin No. 40–UV, Nov., 1965, p. 1, of Sigma Chemical Company, 3500 DeKalb St., St. Louis, Mo. 63118.

(4) Ebashi, S., J. Biochem. 46, 103 (1959), cited in Sigma, supra p. 1.

(5) Sunderman, F. W., Normal Values in Clinical Medicine, W. B. Saunders Company, Philadelphia, 1949, p. 845.

(6) Henry, R. J., Clinical Chemistry, Harper & Row, 1964, p. 414.

(7) ibid. p. 415.

(8) Sunderman, F. W., supra, p. 845.

(9) Sunderman, W. F., Monthly Report, May, 1967, of the Institute for Clinical Science, Inc., 1833 Delancey Place, Philadelphia 3, Pa.

(10) Weil, H., Biochem. J. 49:286 (1951), cited in Henry, supra, p. 415.

(11) Fiske, C. H. and Subbarow, J. Biol. Chem. 66:375 (1925).

(12) Hycel Phosphorus Determinations (1965), Hycel, Inc., P.O. Box 36329, Houston, Tex. 77036.

What is claimed is:

1. In a colorimetric quantitative determination of inorganic phosphate by reaction with molybdate in aqueous solution having an acid pH and forming a molybdo-phosphate complex which is yellowish in its non-reduced form and which is bluish after it is reduced, the use of polyvinylpyrrolidone to hasten the completion of the formation of the molybdo-phosphate complex.

2. The method as set forth in claim 1, in which the concentration of polyvinylpyrrolidone during the formation of the molybdo-phosphate complex is at least 0.5%.

3. The method as set forth in claim 1, in which the concentration of polyvinylpyrrolidone during the formation of the molybdo-phasphate complex is at least 2%.

4. The method as set forth in claim 1, in which the phosphate determination is made by colorimetrically observing the yellowish molybdo-phosphate complex.

5. The method as set forth in claim 1, in its use in the quantitative determination of inorganic phosphate in an assay sample which is proteinaceous, including the step of conversion of the solution which contains the molybdo-phosphate to an alkaline pH thereby substantially reducing, before colorimetric measurement, the turbidity of the solution which contains the molybdo-phosphate complex.

6. The method as set forth in claim 1, in which hydroxylamine of an hydroxylamine compound is used as a reductant of the molybdo-phosphate complex so formed.

7. The method as set forth in claim 6, in which the amount of hydroxylamine of the hydroxylamine compound used is at least 0.75 microgram per each microgram of phosphorus which is to be quantitatively determined in the test.

8. The method as set forth in claim 1, in which the molybdo-phosphate complex is caused to exist as the bluish form by converision of the solution to an alkaline pH, effecting reduction by the presence of an hydroxylamine compound, and colorimetrically determining the bluish molybdo-phosphate complex.

9. The method as set forth in claim 8, in which the hydroxylamine compound is in the same solution which contains the polyvinylpyrrolidone.

10. In a colorimetric quantitative determination of inorganic phosphate by reaction with molybdate in aqueous solution having an acid pH and forming a molybdo-phosphate complex which is yellowish in its non-reduced form and which is bluish after it is reduced, the use of hydroxylamine of an hydroxylamine compound as a reductant of the molybdo-phosphate complex.

11. The method as sett forth in claim 10, in which the concentration of the hydroxylamine in the hydroxylamine compound used is 0.75 microgram per each microgram of phosphorus which is to be quantitatively determined in the test.

12. The method as set forth in claim 10, in which the solution which contains the molybdo-phosphate complex is converted to an alkaline pH, thereby activating the reducing potential of the hydroxylamine compound to permit the hydroxylamine to perform its reducing function, this conversion to an alkaline pH being subsequent to the formation of the yellowish molybdo-phosphate complex.

13. The method as set forth in claim 10, in a process having one step in which the molybdo-phosphate complex is formed in a solution which is at least slightly acid and in which there is used a polypeptide to hasten the completion of the formation of the molybdo-phosphate complex and, in which process, there is a second step in which the solution of said molybdo-phosphate complex is made alkaline, thereby activating the reducing potential of the hydroxylamine compound to permit the hydroxylamine to perform its reducing function.

14. In a colorimetric quantitative determination of inorganic phosphate by reaction with molybdate in aqueous solution having an acid pH and forming a molybdo-phosphate complex which is yellowish in its non-reduced form and which is bluish after it is reduced, the use of polypeptide to hasten the completion of the formation of the molybdo-phosphate complex.

15. A colorimetric method for the quantitative determination of inorganic phosphate content in a fluid, comprising: (a) adding to said fluid an aqueous reagent comprising an acid, a solution containing molybdate ion, an hydroxylamine compound, and polyvinylpyrrolidone; (b) incubating the solution thus formed; (c) adding a strong base to the incubated solutions; and (d) colorimetrically measuring the resulting blue molybdo-phosphate complex.

16. The method as set forth in claim 15 in which the hydroxylamine compound is hydroxylamine hydrochloride.

17. The method as set forth in claim 15 in which the molybdate ion is introduced as sodium molybdate.

18. The method as set forth in claim 15 in which the molybdate ion is introduced as ammonium molybdate.

19. A colorimetric method for the quantitative determination of inorganic phosphate content in a fluid, comprising: (a) adding to said fluid an aqueous reagent comprising an acid, a solution containing molybdate ion, an hydroxlyamine compound, and polypeptide; (b) incubating the solution thus formed; (c) adding a strong base to the incubated solutions; and (d) colorimetrically measuring the resulting blue molybdo-phosphate complex.

20. The method as set forth in claim 19 in which the hydroxylamine compound is hydroxylamine hydrochloride.

21. The method as set forth in claim 19 in which the molybdate ion is introduced as sodium molybdate.

22. The method as set forth in claim 19 in which the molybdate ion is introduced as ammonium molybdate.

23. A colorimetric method for the quantitative determination of inorganic phosphate content in a fluid, comprising: (a) adding to said fluid an aqueous reagent comprising an acid, a solution containing molybdate ion, and polyvinylpyrrolidone; (b) incubating the solution thus formed; (c) adding a strong base to the incubated solutions; and (d) colorimetrically measuring the resulting yellow molybdo-phosphate complex.

References Cited

UNITED STATES PATENTS 3,425,805   2/1969   Grobin _____ 23—230

OTHER REFERENCES

P. B. Hawk et al., "Practical Physiological Chemistry," 951–955, McGraw-Hill Book Co., Inc., New York, 1947.

C. A. 54:21283a (1960).

JOSEPH SCOVRONEK, Primary Examiner

SIDNEY MARANTZ, Assistant Examiner

U.S. Cl. X.R.

195—103.5; 252—408